(12) United States Patent
Ayers

(10) Patent No.: US 8,639,186 B2
(45) Date of Patent: Jan. 28, 2014

(54) TELEMETRY CONVEYED BY PIPE UTILIZING SPECKS

(75) Inventor: David Blaine Ayers, Sugar Land, TX (US)

(73) Assignee: Sondex Wireline Limited (GB)

( * ) Notice: Subject to any disclaimer, the term of this patent is extended or adjusted under 35 U.S.C. 154(b) by 432 days.

(21) Appl. No.: 12/914,196

(22) Filed: Oct. 28, 2010

(65) Prior Publication Data
US 2012/0108171 A1 May 3, 2012

(51) Int. Cl.
*H04B 7/00* (2006.01)

(52) U.S. Cl.
USPC ............ 455/41.2; 455/572; 455/573; 455/83; 455/343.1; 285/333; 29/527.2; 138/109; 340/854.6; 340/854.8; 367/82; 367/165

(58) Field of Classification Search
USPC ....................... 455/41.2, 343.1, 573; 285/333; 138/109; 367/82, 165, 180; 340/854.6, 340/854.8; 175/215, 40; 29/527.2
See application file for complete search history.

(56) References Cited

U.S. PATENT DOCUMENTS

| | | | |
|---|---|---|---|
| 6,009,472 A | 12/1999 | Boudou et al. | |
| 7,453,768 B2 * | 11/2008 | Hall et al. | 367/82 |
| 7,656,309 B2 * | 2/2010 | Hall et al. | 340/854.6 |
| 7,945,488 B2 * | 5/2011 | Karr et al. | 705/28 |
| 8,057,233 B2 * | 11/2011 | Owen | 434/169 |
| 8,072,347 B2 * | 12/2011 | Santoso et al. | 340/854.9 |
| 8,130,118 B2 * | 3/2012 | Hall et al. | 340/853.7 |
| 8,164,476 B2 * | 4/2012 | Hache et al. | 340/854.4 |
| 8,286,728 B2 * | 10/2012 | Veeningen | 175/40 |
| 8,326,538 B2 * | 12/2012 | Hobbs et al. | 702/6 |
| 2005/0227736 A1 | 10/2005 | Jung et al. | |
| 2006/0215476 A1 | 9/2006 | Owen | |
| 2007/0058634 A1 | 3/2007 | Gupta et al. | |
| 2007/0210929 A1 | 9/2007 | Sabata et al. | |
| 2010/0147510 A1 * | 6/2010 | Kwok et al. | 166/250.01 |
| 2012/0133526 A1 * | 5/2012 | Christiansen | 340/854.6 |

OTHER PUBLICATIONS

Butera, William Joseph, "Programming a Paintable Computer", copyrighted, Massachusetts Institute of Technology, Feb. 2002, All Rights Reserved.

* cited by examiner

*Primary Examiner* — Marceau Milord
(74) *Attorney, Agent, or Firm* — Crowe & Dunlevy

(57) ABSTRACT

Drill pipe segments, communication systems, and methods of manufacturing pipe segments usable for communicating data wirelessly between sensors and tools placed in an oil and/or gas well are provided. Communication specks are applied on at least one of an outer surface or an inner surface of the pipe segments or coil tubing.

13 Claims, 8 Drawing Sheets

TELEMETRY CONVEYED BY PIPE UTILIZING SPECKS

BACKGROUND

1. Technical Field

Embodiments of the subject matter disclosed herein generally relate to methods and systems usable for transmitting information along a pipe using specks.

2. Discussion of the Background

Oil and gas extraction remains a critical component of the world economy in spite of increasing challenges regarding accessibility of the oil reserves and safety of the exploitation. Oil and gas wells are bored deeper into the Earth's crust, often underneath the ocean or sea floor. To make a new well, rotating drill strings with a bit attached dig holes having diameters between 0.1 to 1 m. As the well is drilled, a casing may be inserted and cemented to the well's walls. A pipe made of pipe sections may be assembled inside the casing to form a continuous pipe inside the well.

At various location and at a bottom of a well drilled to extract oil and gas, as shown in FIG. 1, at hundreds or thousands of meters inside the Earth's crust, a plurality of sensors and tools 10 may acquire information about drilling parameters (e.g., inclination, temperature, pressure, weight of penetration, weight on bit) or rock formation (e.g., electrical conductivity, density, porosity, permeability).

Conventionally, the information (i.e., data) is transmitted from the sensors and tools to a server 20 at the surface, using a data cable 30 attached to a segmented pipe 40. The data cable 30 may be inside the pipe 40 or between the pipe 40 and the casing or the walls of the well. Alternatively, a wire is placed into a hole drilled in the wall of each drill pipe segment, and toroidal inductors are located at the top and at the bottom of each drill pipe segment. These inductors come into close proximity when the drill pipe segments are assembled, acting like a transmitting antenna or a receiving antenna, respectively.

The segmented pipe 40 is gradually built by adding on top segments (e.g., of about 9 m length) as the depth of the well increases. Parallel with increasing the length of the pipe 40, new segments are added to the data cable 30, including amplifiers, repeaters and other nodes 50 aimed to preserve the data quality along the path from the source (i.e., the sensors and tools 10 at the bottom of the well) to the destination (i.e., the server 20 at the surface).

As a person of skill in the art understands, the continuity and integrity of the data cable 30 are necessary for the data to reach the destination. However, the data cable 30 may broke and repairs are expensive and may take a long time. If the data cable 30 includes the wires inside the wall of the drill pipe segments, the drill pipe may have to be removed from the well.

Another method of communication between sensors and tools in the well and the surface is mud pulse telemetry, but this method offers a slow data rate (maximum 12 bits/s).

Accordingly, it would be desirable to provide systems and methods that have a good data rate transmission, are fault tolerant and cheap to repair if necessary.

SUMMARY

According to one exemplary embodiment, a drill pipe segment includes a pipe and communication specks disposed on a surface of the pipe. The pipe has a first terminal portion, at a first end of the pipe, and a second terminal portion, at a second end of the pipe, opposite to the first end, the first terminal portion and the second terminal portion being configured to allow assembling the drill pipe segment with another substantially similar drill pipe segment, at the first end and at the second end. Each of the communication specks is configured to communicate wirelessly data with other of the communication specks located on the pipe or on an adjacent substantially similar drill pipe segment, within a communication radius of the communication speck.

According to another exemplary embodiment, a communication system associated includes (i) a plurality of drill pipe segments configured to assembled with each other to form a segmented pipe, and (ii) communication specks applied on an outer surface or an inner surface of at least some of the drill pipe segments, to enable wireless communication via the communication specks, each of the communication specks being configured to communicate wirelessly with other of the communication specks located on the same pipe segment or on an adjacent pipe segment, within a communication radius.

According to another exemplary embodiment, a method of manufacturing drill pipe segments includes providing a pipe configured to assemble with another substantially similar pipe, and applying communication specks on at least a portion of an inner or an outer surface of the pipe, each communication speck being configured to communicate wirelessly data with other of the communication specks located within a communication radius, on the pipe or on an adjacent pipe.

According to another exemplary embodiment, a communication system includes coil tubing and communication specks disposed on an outer or an inner surface of the coil tubing, each communication speck being configured to communicate wirelessly data with other of the communication specks located on the coil tubing within a communication radius.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of speck computing and oil drilling technologies. However, the embodiments to be discussed next are not limited to these systems, but may be applied to other systems that require a fault tolerant communication in an adverse and difficult to access environment.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

In recent years, integrated circuits capable to perform data processing have become smaller and smaller. Computing particles or specks are pinless integrated circuits of a few millimeters. They may be powered parasitically. Further miniaturization is foreseeable in particular for communication specks, which are dedicated only to receiving and retransmitting data.

Figure 1:
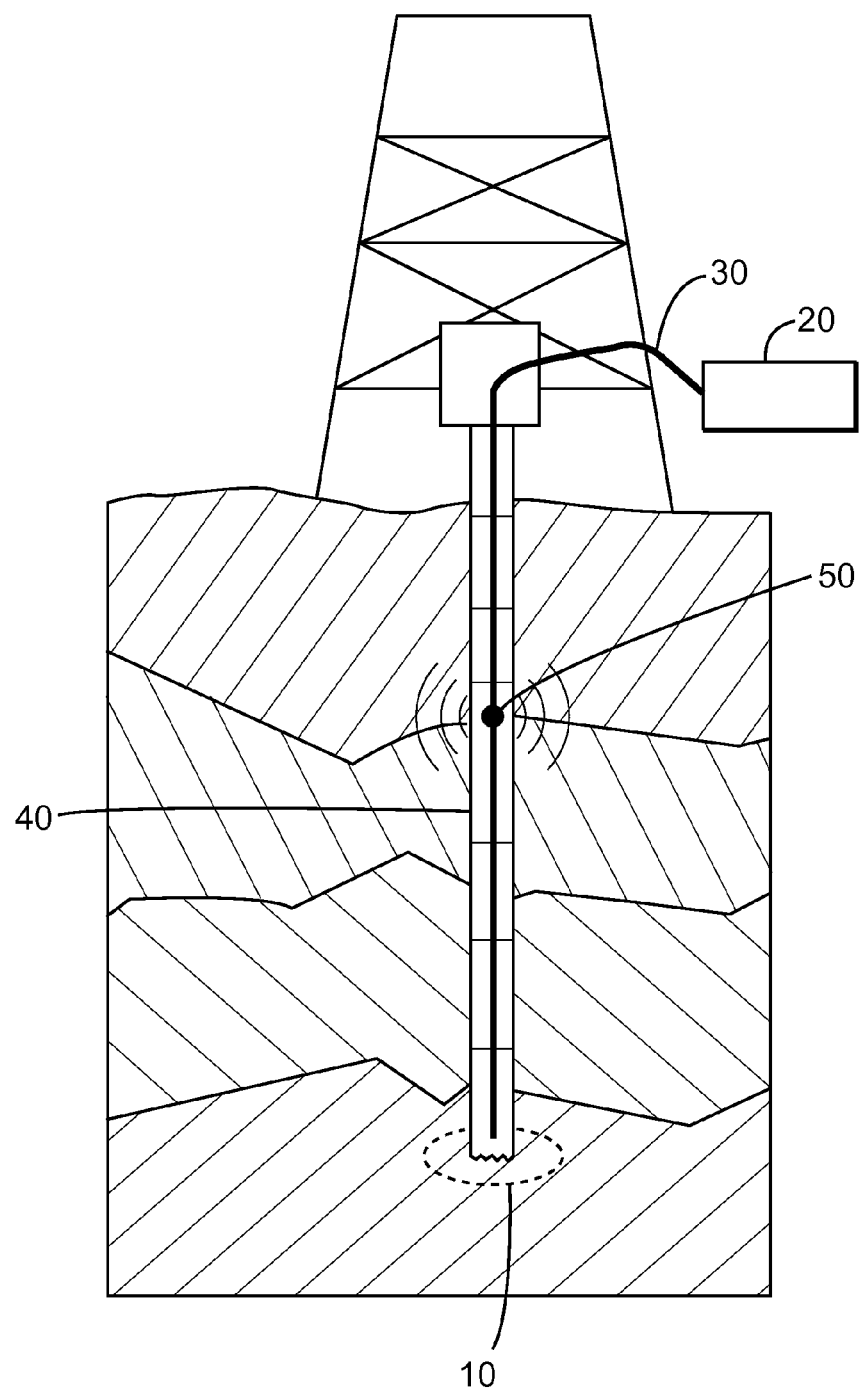
FIG. 1 is a schematic diagram of a well using a conventional communication medium.
Figure 2:
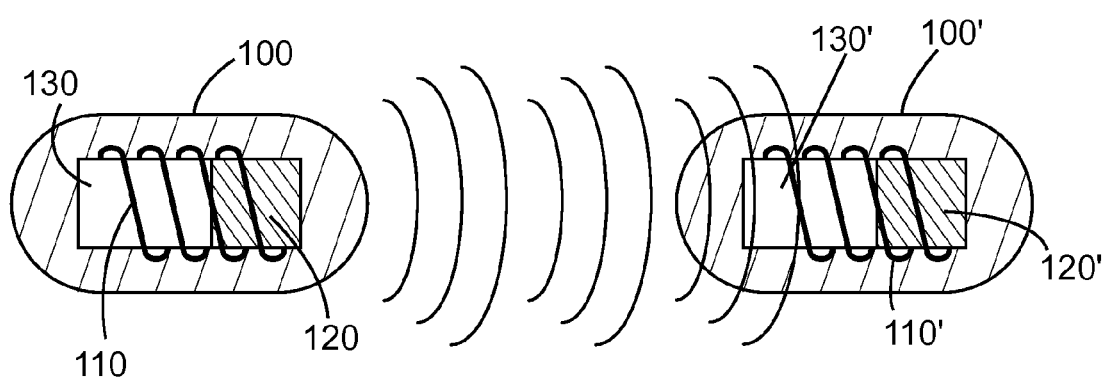
FIG. 2 is a schematic diagram of communication specks used in various embodiments.

FIG. 2 illustrates communication specks, which are intended to be used in various embodiments. In fact, FIG. 2 illustrates two identical specks 100 and 100'. Each of the communication specks 100 and 100' has an antenna 110 and 110', respectively. The antennas 110 and 110' are configured to receive first signals including the data, and to broadcast second signals including the data, respectively. A communication frequency may be selected such as (i) to avoid degradation of the signals due to other signals naturally or artificially produced inside a drilled well, (ii) to span a predetermined distance or (iii) to fit within the available power budget.

Further, each of the communication specks 100 and 100' includes a control electronics block 120 or 120', respectively. The respective control electronics block 120 or 120' is configured to process a received first signal and to generate a second signal that is then broadcasted via the respective antenna 110 or 110'. The processing of the first signal may include filtering and amplifying, in order to achieve, for example, a better signal to noise ratio in the second signal than in the first signal. The control electronics blocks 120 or 120' may be hardware, software or a combination of hardware and software. The control electronics blocks can also intelligently control and cooperatively configure an array of specks. For example, certain specks may be instructed to lie dormant for a period of time for conserving power, to transmit the second signal with a specified strength for optimizing the network, etc.

Each of the communication specks 100 and 100' may also include a power source 130 and 130', respectively, configured to provide power to the antenna and to the control electronics block of the communication speck. The power source may be a battery and/or a parasitic power generator. For example, the power source 130 or 130' may include a piezoelectric element converting vibrations occurring during drilling into electric power.

Once provided with power, each communication speck identifies neighboring communication specks with which it can communicate via asynchronous links. There are minimal constraints relative to a speck's placement and orientation on the pipe. The communication specks are essentially isolated from the world beyond their communication radius.

Figure 3:
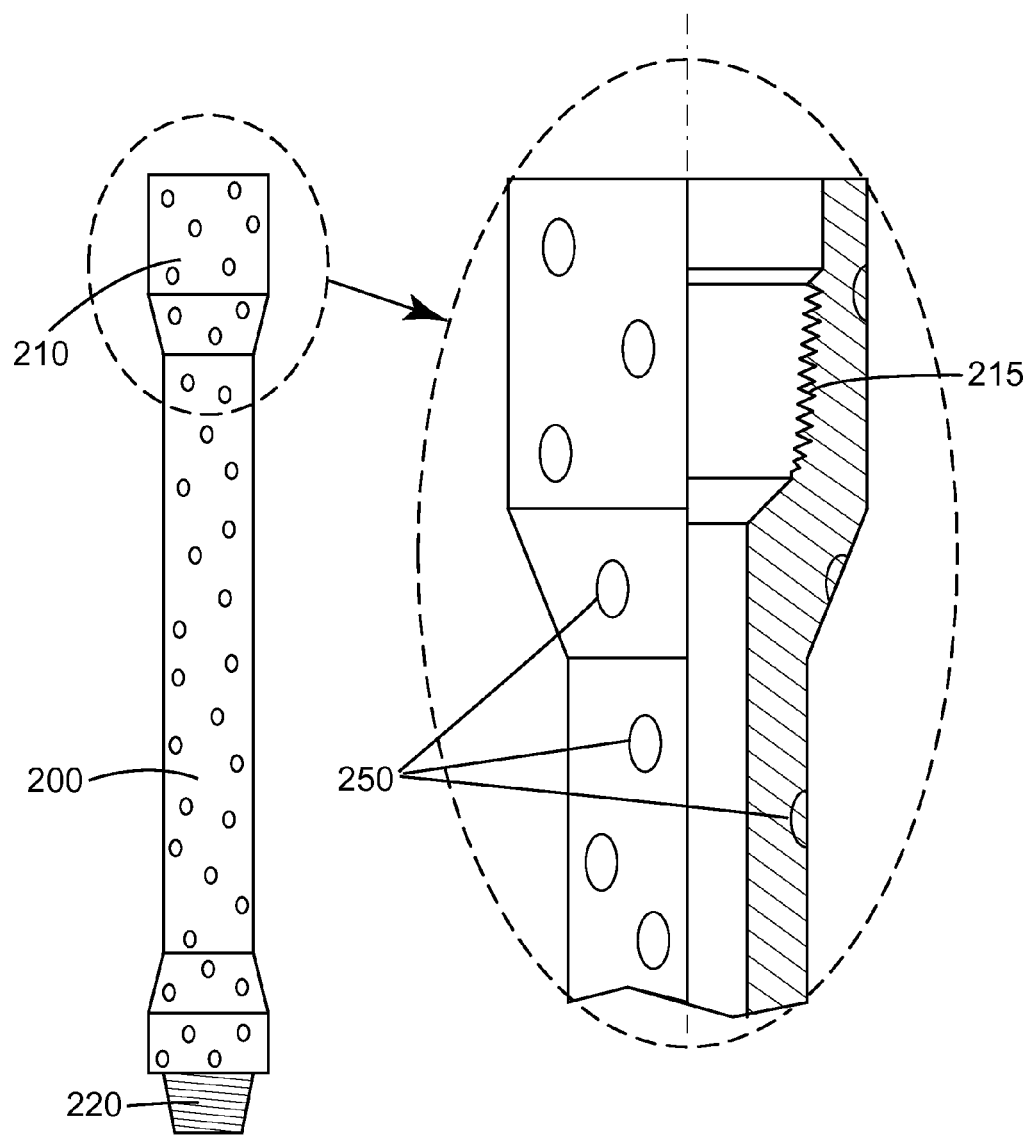
FIG. 3 is a schematic diagram of a segment of a drill pipe with grain specks glued on an exterior surface according to an exemplary embodiment.

FIG. 3 illustrates a pipe segment usable to build a drill pipe in a gas and/or oil drilling well. The pipe segment 200 is configured to be assembled with another substantially similar pipe segment at both ends. In this non-limiting embodiment, the pipe segment 200, which may be made of steel, has a first terminal portion 210 with inner threads 215 at one end, and a second terminal portion 220 with outside threads at the opposite end.

On the outer surface of the pipe segment 200, communication specks 250 having a structure similar to the communication specks illustrated in FIG. 2 are attached. The communication specks 250, which may be few millimeters in length, are configured to receive and retransmit data from and to other communication specks located within a communication radius. In one embodiment, the communication specks 250 may be glued on the outer surface of the pipe. In another embodiment, the communication specks 250 may be added to the resin of plastic or the resin of a composite, such as, fiberglass, for pipe segments made from these materials, the specks being embedded within the pipe wall. In another embodiment, recesses may be drilled or milled on the surface of the pipe 200 to make room for the computing specks 250.

The communication specks 250 are arranged on the outer surface of the drill pipe segment 200 to enable transfer of data from a communication speck to a next communication speck, from one end to the opposite end of the pipe segment 200.

Figure 4:
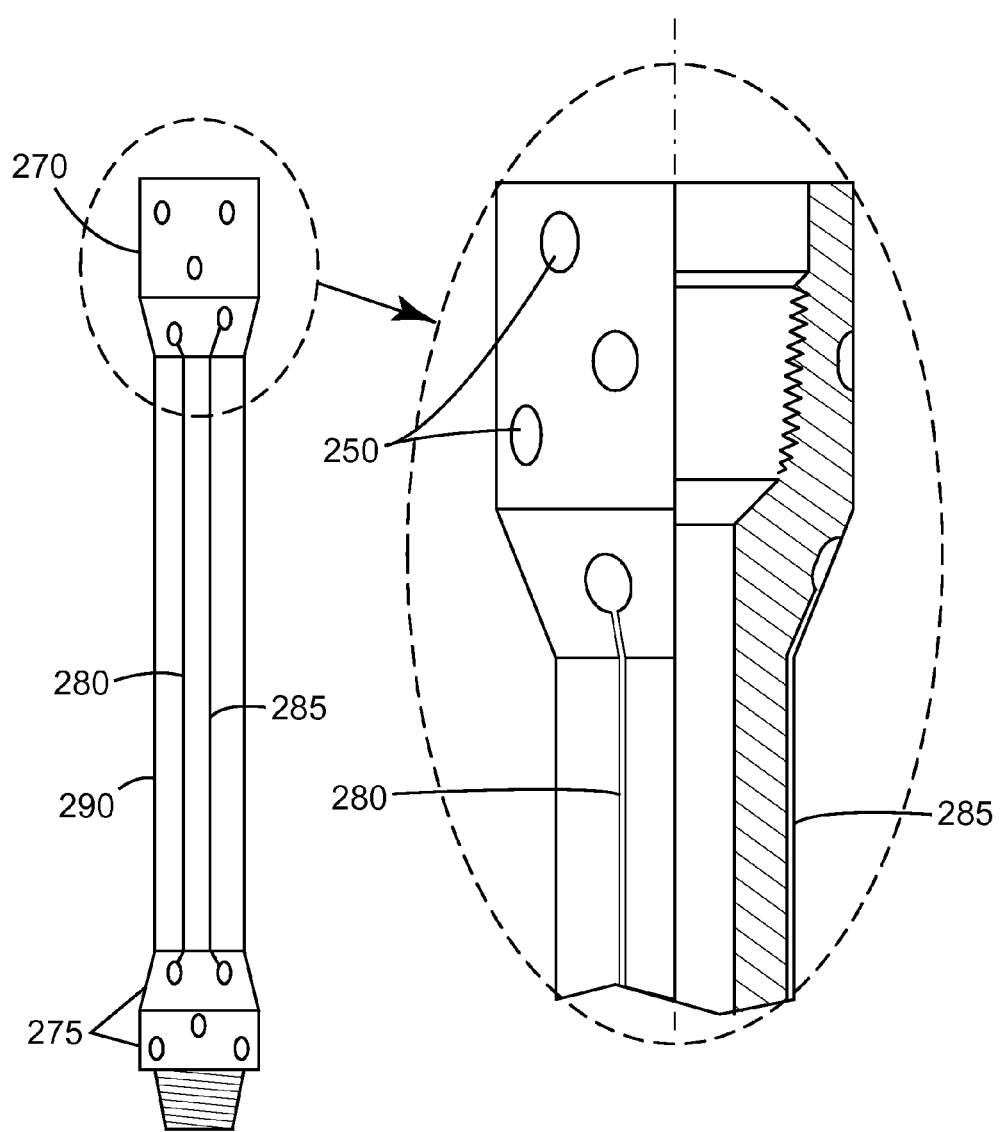
FIG. 4 is a schematic diagram of a segment of a drill pipe with small specks painted on an external surface according to another exemplary embodiment.

According to another exemplary embodiment illustrated in FIG. 4, a pipe segment has communication specks 250 applied only on terminal portions 270 and 275. One or more wires, such as 280 and 285 may run along a middle section 290 of the pipe segment, between the terminal portions 270 and 275. The wires 280 and 285 are configured to transmit data between a plurality of specks at one terminal portion (e.g., 270) and another plurality of specks at the opposite terminal portion (e.g., 275). Here, the communication specks are primarily employed to ensure continuity of data transmission from one pipe segment to a next pipe segment. This embodiment has the advantage that costs associated with application of the specks are lowered.

Figure 5:
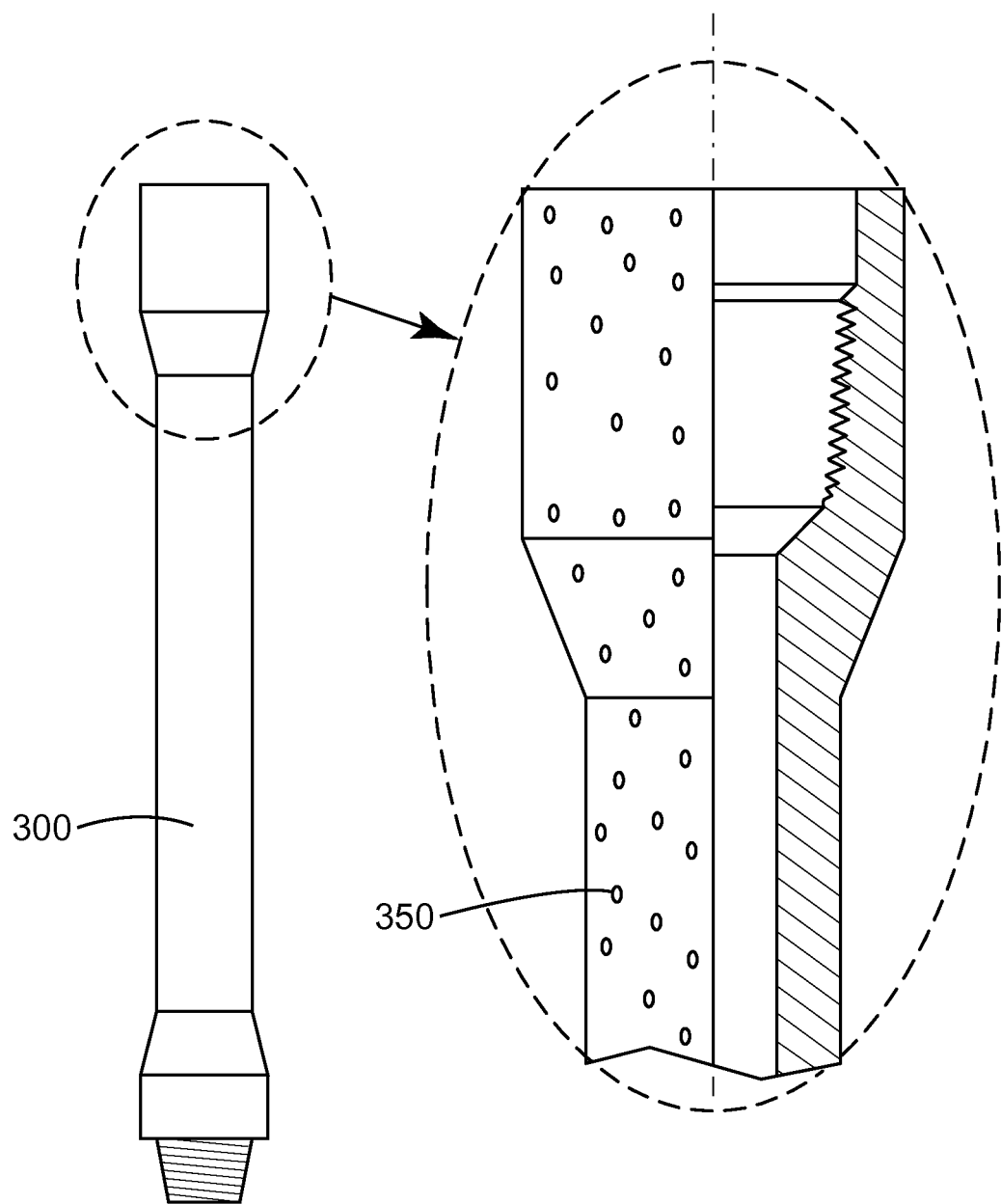
FIG. 5 is a schematic diagram of a segment of a drill pipe with small specks painted on an internal surface according to another exemplary embodiment.

According to another embodiment illustrated in FIG. 5, communication specks 350, which are smaller than the communication specks 250 illustrated in FIG. 3, are mixed into a coat (e.g., an epoxy based paint) and applied on the external surface of a pipe segment 300.

Figure 6:
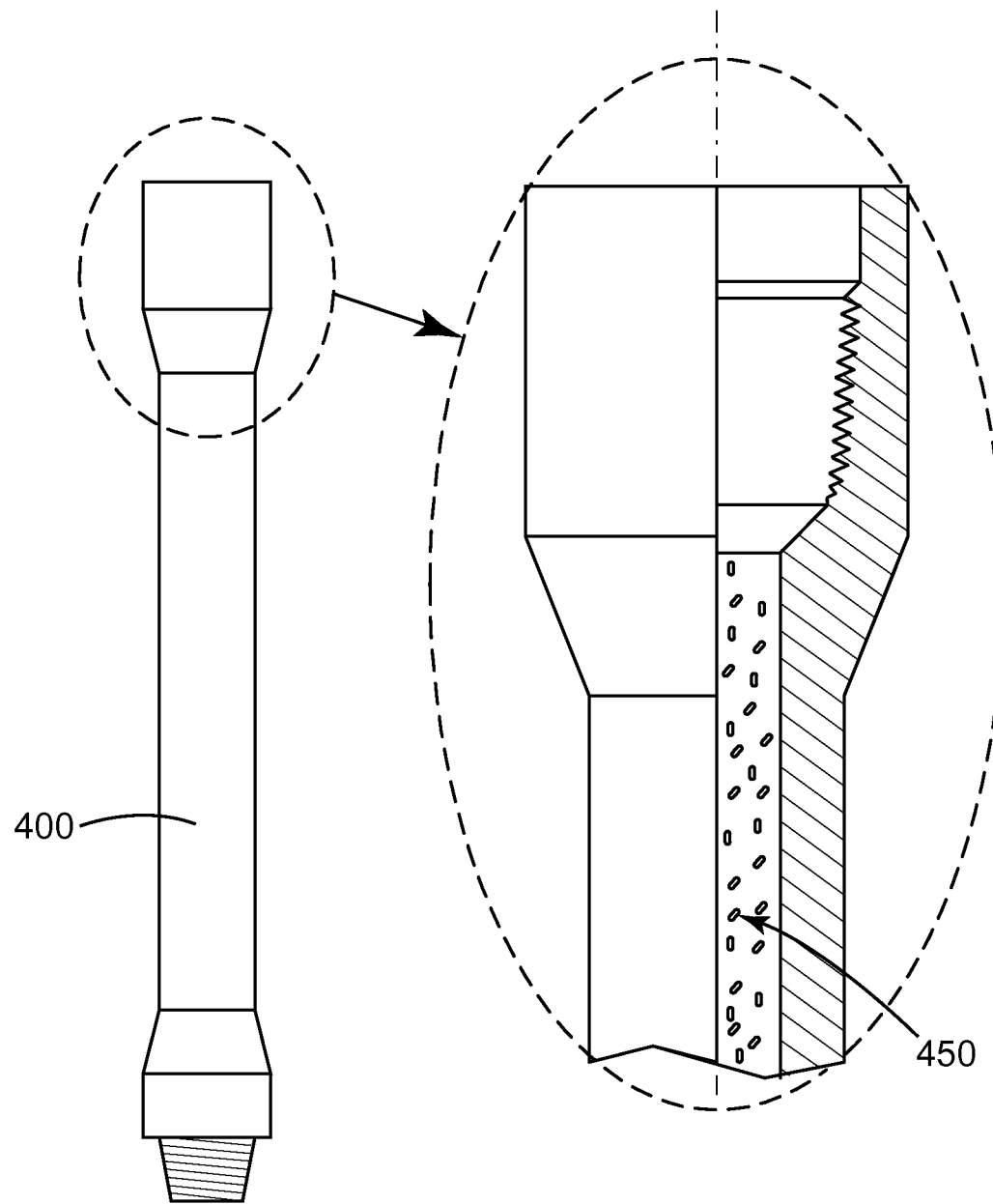
FIG. 6 is a schematic diagram of a segment of a drill pipe with specks located only on terminal parts, according to another exemplary embodiment.

According to another embodiment illustrated in FIG. 6, communication specks 450, which are smaller than the communication specks 250 illustrated in FIG. 3, are mixed into a coat (e.g., an epoxy based paint) and applied on the internal surface of a drill pipe segment 400.

In the embodiments illustrated in FIGS. 3, 4, 5, and 6 the communication specks are applied on the surface of the pipe at a density that ensures that each communication speck has at least two other communication specks within the communication radius.

Figure 7:
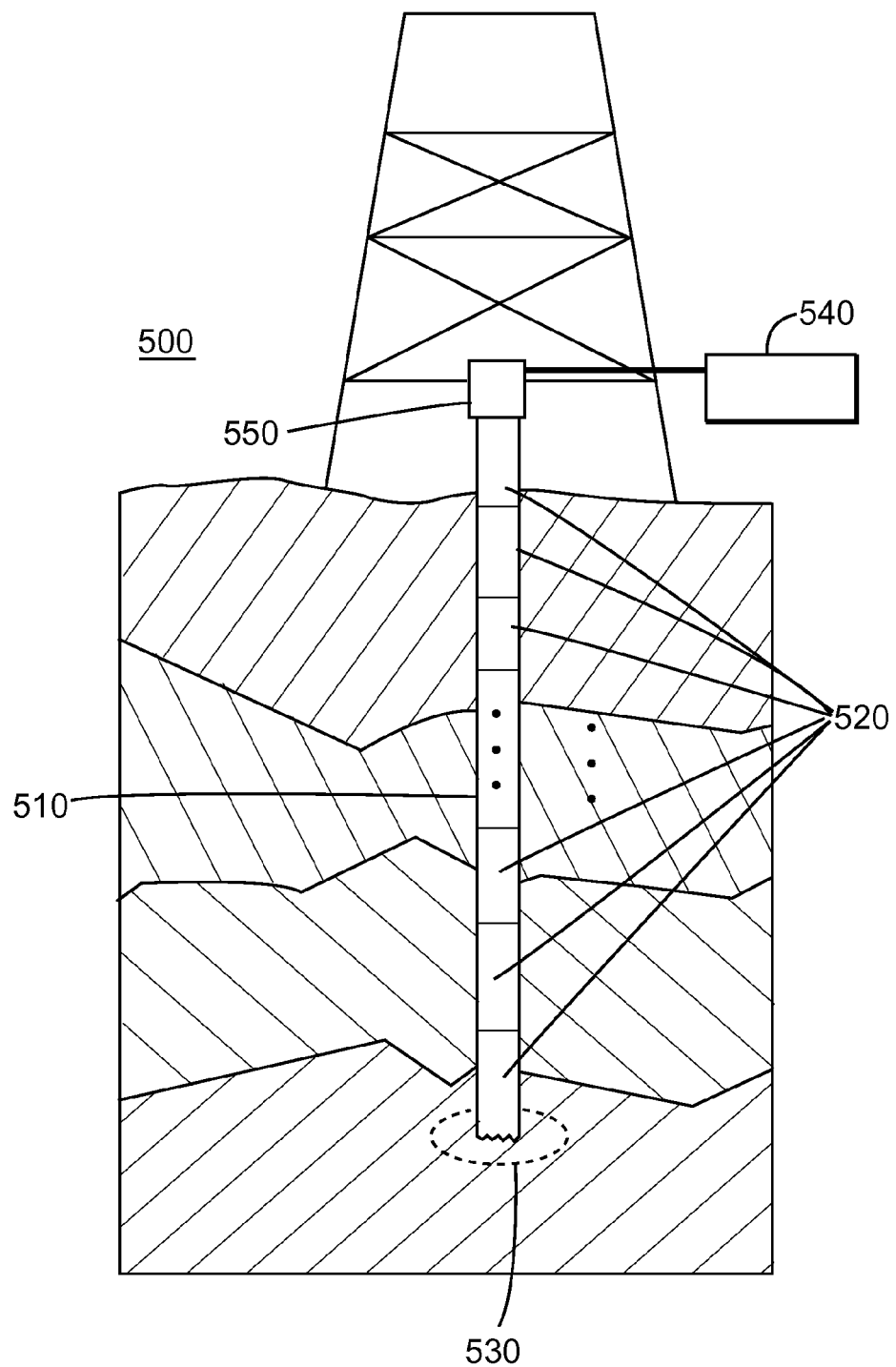
FIG. 7 illustrates a communication system associated with a segmented drill pipe according to another exemplary embodiment.

According to an exemplary embodiment illustrated in FIG. 7, a communication system 500 associated with a drill pipe 510 usable for oil and gas exploration and/or exploitation. The drill pipe 510 includes a plurality of drill pipe segments 520 configured to be assembled with each other and lowered inside a well. Communication specks are applied on an outer and/or an inner surface of each of the drill pipe segments. In some embodiments, the communication specks are not applied on areas covered by inner or outer threads. The communication specks are part of a communication path between sensors and tools that may be located at the bottom of the well 530 and a server 540 at a top of the well. This communication path includes portions along which data is transmitted wirelessly using communication specks.

Usually, various sensors are bundled towards the end of the drill pipe because desired information (drilling parameters, rock formation characteristics) is acquired where a drill bit is cutting. However, some sensors may be placed at other locations within the hole or drill line for collecting information (e.g., "smart bullets" may be fired into the rock at different drilling depths to gather pressure data). The telemetry conveyed by the drill pipe using specks may be configured to cover all such data communication requirements. Additionally, communication using specks is expected to operate satisfactory (i.e., transmit data effectively) regardless of the environment, whether the drill pipe is surrounded by air, rocks, drilling mud or by sea water.

The communication system 500 may further include an interface 550 configured to receive and extract the data transmitted along the communication path.

In contrast to the communication via a data cable, the communication via communication specks has the advantage that accidental destruction or malfunction of some communication specks is unlikely to disrupt the data flow since the data can reach the surface through many alternative paths, from a communication speck to another.

Figure 8:
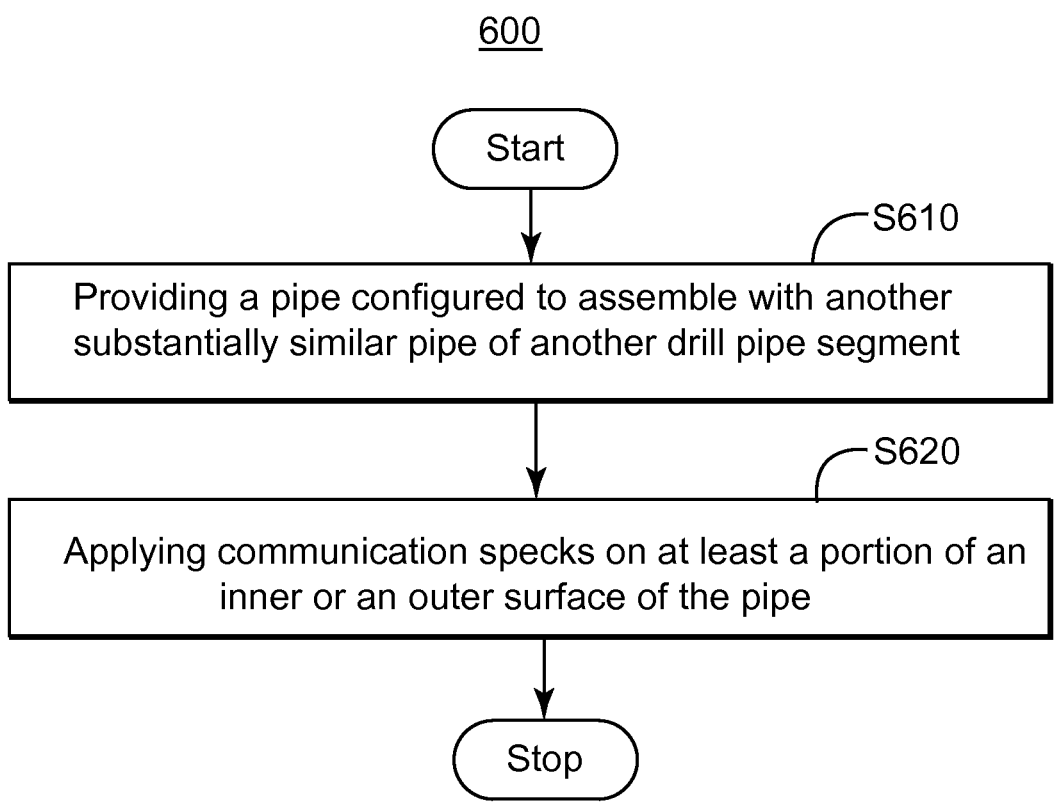
FIG. 8 is a flow chart illustrating steps performed by a method for manufacturing and maintaining a drill pipe according to another exemplary embodiment.

A method 600 of manufacturing drill pipe segments configured to assemble with each other is illustrated in FIG. 8. The method includes manufacturing of the pipe, for example, from steel, at S610.

The method 600 further includes applying communication specks on a surface of the pipe, each communication speck being configured to communicate wirelessly data with other of the communication specks located within a communication radius, at S620. Depending on their size, the communication specks may be glued or painted on an outer surface and/or an inner surface of the pipe.

During a maintenance operation, new communication specks may be reapplied on the surface of the pipe in areas where some of the communication specks have been damaged or removed.

According to another embodiment, communication specks may be applied on an outer or an inner surface of coil tubing to enable a multipath flexible wireless communication along the coil tubing.

The disclosed exemplary embodiments provide drill pipe segments, communication systems and methods of manufacturing drill pipe segments using communication specks exchanging data wirelessly. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A drill pipe segment, comprising:
a pipe having a first terminal portion, at a first end of the pipe, and a second terminal portion, at a second end of the pipe, opposite to the first end, the first terminal portion and the second terminal portion being configured to allow assembling the drill pipe segment with another substantially similar drill pipe segment, at the first end and at the second end; and
communication specks disposed on a surface of the pipe, each communication speck being configured to communicate wirelessly data with other of the communication specks located on the pipe or on an adjacent substantially similar drill pipe segment, within a communication radius of the communication speck, wherein each communication speck comprises:
an antenna configured to receive first signals including the data and to broadcast second signals including the data;
a control electronics block connected to the antenna and configured to process the first signals and to generate the second signals; and
a power source configured to provide power to the antenna and the control electronics.

2. The drill pipe segment of claim 1, wherein the control electronics is one of hardware, software or a combination of hardware and software.

3. The drill pipe segment of claim 1, wherein the communication specks are glued on an external surface of the pipe.

4. The drill pipe segment of claim 1, wherein the communication specks are mixed into a coat and applied on an external surface of the pipe.

5. The drill pipe segment of claim 1, wherein the communication specks are mixed into a coat and applied on an internal surface of the pipe.

6. The drill pipe segment of claim 1, further comprising:
one or more wires disposed along a middle section of the drill pipe segment, the one or more wires being configured to transmit data between first communication specks applied on the first terminal portion, and second communication specks applied on the second terminal portion.

7. The drill pipe segment of claim 1, wherein the power source of some of the communication specks is a parasitic power generator.

8. The drill pipe segment of claim 7, wherein the parasitic power generator includes a piezoelectric element converting vibrations occurring during drilling into electric power.

9. The drill pipe segment of claim 1, wherein the first terminal portion has inner threads, and the second terminal portion has outer threads, the inner threads and the outer threads being used to assemble the drill pipe segment with another substantially similar drill pipe segment.

10. The drill pipe segment of claim 9, wherein communication specks are not applied on the inner threads and on the outer threads.

11. A communication system, comprising:
a plurality of pipe segments configured to be assembled with each other to form a segmented pipe; and
communication specks applied on an outer or an inner surface of at least some of the pipe segments, to enable wireless communication via the communication specks, each of the communication specks being configured to communicate wirelessly with other of the communication specks located on the same pipe segment or on an adjacent pipe segment, within a communication radius, wherein each of the communication specks comprises:
- an antenna configured to receive first signals including the data and to broadcast second signals including the data;
- a control electronics block connected to the antenna and configured to process the first signal and to generate the second signals; and
- a power source configured to provide power to the antenna and the control electronics.

12. The communication system of claim 11, further comprising:
- a sensor configured to acquire information about one or more drilling parameters and to generate the data based on the acquired information.

13. The communication system of claim 11, further comprising:
- an interface configured to receive and extract the data transmitted at least partially wireless via the communication specks, the interface being located close to the top of the segmented drill pipe.

* * * * *